May 26, 1959 — H. H. HILL — 2,888,028
WASHING AND STERILIZING MEANS FOR MILKING LINE VALVES
Filed Jan. 25, 1956
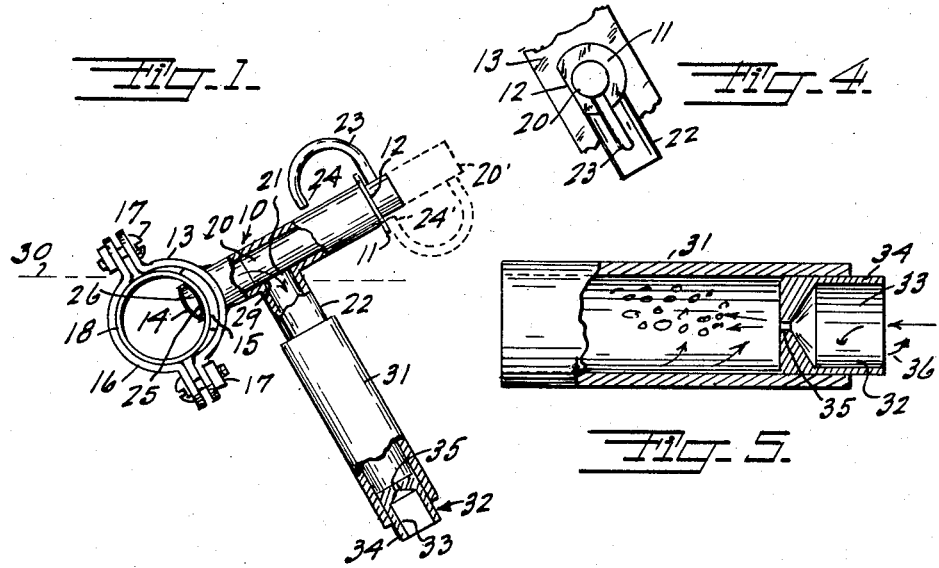
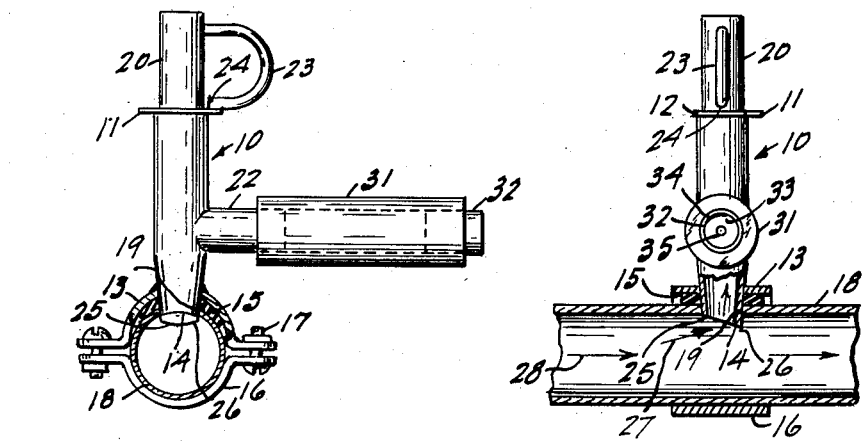
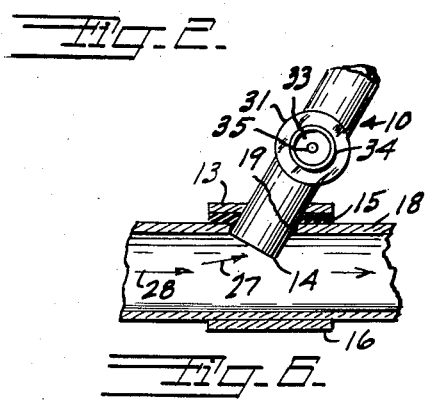
INVENTOR.
Henry H. Hill
BY Philip A. [Iredell]
Attorney

United States Patent Office 2,888,028
Patented May 26, 1959

2,888,028

WASHING AND STERILIZING MEANS FOR MILKING LINE VALVES

Henry H. Hill, Yreka, Calif.

Application January 25, 1956, Serial No. 561,280

3 Claims. (Cl. 137—240)

This invention relates to improvements in methods and means for washing and sterilizing the valves of milking lines and provides an attachment which is connected to the milk line nipple when the milking tube from the milking unit is disconnected, the valve being closed before the milking tube is disconnected, and so maintained until the milking line is to be washed. The valve is opened when washing is started and is then washed and sterilized coincidentally. This invention not alone washes and sterilizes the valve but is also insect proof in that insects are repelled and thus prevented from crawling across and being sucked into the air vent.

Various methods have been employed toward the attainment of the results mentioned, but lack in some essential feature such as the provision of too large an air vent or drilling the hole in a plane cap, has resulted in failure since flies and other insects can craw over the plane surface in which case they are instantly sucked through the vent by the sub-atmospheric pressure existent in the milking line during the washing operation.

This invention overcomes all of the faults inherent in existing methods and devices because the tiny hole for admission of air is located in the conical bottom of a relatively deep socket, causing eddy currents to be developed in the socket creating a reverse current about the periphery and thus blowing any insects out of the path of the inward air flow, and, due to the depth of the socket and the form of the bottom of the socket, a fly or other insect cannot or will not crawl across the vent even when there is no suction. This attachment has been tested over a substantial period of time under proper conditions to determine if any insects would proceed to any position where they could be sucked through the hole and in no case has it ever occurred.

The objects and advantages of the invention are as follows:

First, to provide an attachment applicable at will for washing and sterilizing the valves of a milking line.

Second, to provide an attachment as outlined which is sanitary and insect proof, preventing insects from being sucked into the milking line by the existent subatmospheric pressure in the line.

Third, to provide an attachment as outlined which is easily and quickly applied to the milking tube connection when the milking unit is disconnected.

Fourth, to provide an attachment as outlined which includes a baffle formed on the inner end of the valve for diverting flow of washing and sterilizing solution into the milking tube connection and sterilizing and cleaning attachment.

Fifth, to provide an attachment as outlined which is of the utmost simplicity in construction and economical to manufacture.

In describing the invention reference will be had to the accompanying drawings, in which:

Fig. 1 is a side elevation of the invention shown with its proper inclination, and partly shown in section.

Fig. 2 is an end view of a milking line with the invention shown in a vertical position for purposes of clarity.

Fig. 3 is a front elevation of Fig. 2, with the milking line, clamp and gasket shown in section.

Fig. 4 is a top view of the valve and attachment of Fig. 1.

Fig. 5 is an enlarged fragmentary section through two elements of the invention showing the air inlet plug with attached tubing.

Fig. 6 shows a modification in which the baffle is formed interiorly of the milking tube by mounting the valve at an angle to the perpendicular, the valve being shown fragmentarily.

The valves are all removable from the milking line at will, and each consists of the valve housing 10 which terminates at its upper end in an annular flange 11, one side 12 of which is cut back to the periphery of the valve housing as shown. The other end of the housing is fixed in one element 13 of a clamp, with the terminal end of the housing projecting inwardly as indicated at 14. A gasket 15 is fitted over this projecting end in contact with the inner surface of the clamp element 13, and a companion clamp element 16 with suitable securing means 17 is provided for securing and sealing the valve to milking line 18, the milking line 18 having a passage 19 formed through the wall for the projecting end 14 of the valve and which end intrudes into the milking line.

The valve includes a plunger 20 which slidably fits in the housing and is movable to two positions; as shown in Fig. 1 in which the plunger closes the passage 21 from the milking nipple or connection 22, and in which case the semi-circular handle 23 which has one end fixed in the upper end of the plunger, has its other end below the flange as indicated at 24, and in the other position the passage 21 is open with the upper end of the plunger projecting outwardly as indicated by the dotted figure 20' in Fig. 1, and in solid lines in Figs. 2 and 3 at 20, with the other or free end of the handle resting on top of the flange as indicated at 24' in Fig. 1 and at 24 in Figs. 2 and 3, the plunger being retained by gravity and by suction in the milking line.

The valve is attached by inserting the projecting end of the housing through the passage in the milking line and is then clamped tight by the securing means 17, efficiently sealing the joint through the medium of the resilient washer or gasket 15.

One of the principal features of the invention consists in forming a baffle inside the milking line by either cutting away one side of the projecting end of the housing as indicated at 25 and leaving the other side 26 project suitably into the path of the washing and sterilizing solution as indicated by the arrow 27, the flow of the solution being in the direction indicated by the arrow 28, to divert a portion of the solution into the lower part of the housing and into the nipple, the valve being set at an angle of approximately 30 degrees from the horizontal so that the lower edge 29 of the nipple passage 21 will be disposed in a plane below the top of the inner periphery of the milk line as indicated by the line 30, for gravity passage of solution into the nipple.

The other principal feature of the invention comprises a relatively short length of tubing which may be of metal frictionally fitting on the nipple, or of suitable resilient material such as vinyl plastic, this section of tubing being shown at 31, and which fits over the end of the nipple 22, the other end being provided with a plug or head 32 which is fixed, or as shown, frictionally fits in this other end, this plug or head having an axial bore 33 which is relatively large in diameter to leave a relatively thin wall 34, the outside diameter being substantially the same as the nipple 22, and the depth of the hole being substantially equal to or greater than its diameter, with the bore terminating in a conical bottom through the apex of which a very small diameter hole is drilled as indicated at 35, a 70 drill having been found most satisfactory for admitting just the right amount of air for proper washing without blocking passage of solution from the milk line into the valve and nipple and the washer tube. It will be realized that this valve washer so far as the tube and head are concerned can be formed as a unit from either metal or plastic and that it actually forms an elongated perforated cap fitting over the outside of the milking unit tube connection or nipple.

The solution diverted by the baffle 14 passes into the valve housing, thence through the nipple into the tube or cap 31 while the suction set up by the sub-atmospheric pressure in the milk line draws a fine stream of air through the tiny passage 35, creating a violent action and sudsing of the solution, thoroughly cleansing and sterilizing all contact surfaces of the valve interior.

Due to the eddies set up in the socket as indicated at 36, any insect alighting or crawling to the edge of the head will be blown or caused to leave, and because of the conical bottom and the eddy formed thereat, a fly cannot crawl across the vent to be drawn through the tiny passage into the milk line, as occurs with vents which are formed directly from a plane surface.

I claim:

1. A valve washer for a milk line having a valve having a nipple for attachment of a milking unit and having a baffle projecting into the milk line for diverting washing solution into the valve, nipple, and valve washer, comprising a cap attachable and sealable to said nipple and having a head having a countersunk socket formed therein and terminating in an axial capillary passage for admitting free air in restricted volume for frothing the washing solution, with said countersunk socket with its axial capillary passage creating eddy currents within the socket repelling insects approaching the capillary passage.

2. A structure as defined in claim 1, said valve washer including a tube formed of resilient material with said cap fitting in one end thereof with the other end fitting on said nipple, said socket being formed cylindrically to a diameter slightly less than the external diameter of the cap to form thin walls with an extremely thin outer edge to prevent insects from alighting on said edge, said socket having a depth at least equal to its diameter and terminating in a conical bottom, the combination of thin walls with thin outer edge, deep socket, and conical bottom in conjunction with suction through said passage acting to repel insects and thus prevent suction thereof through said passage.

3. A washer for a milk line valve having a nipple for attachment to a milking unit and having a baffle projecting into the milk line to divert washing solution into the valve, nipple, and valve washer, comprising a resilient tube attachable at one end to said nipple, a cap attachable to the other end and having a cylindrical socket formed axially therein and having a depth at least equal to its diameter and terminating in a conical bottom and having a capillary passage formed axially inward through said conical bottom for passage of a limited amount of air into the washer for frothing the solution, said socket with its conical bottom acting to repel insects from said passage through eddy currents developed in the socket by air suctioned through the passage into the valve washer.

References Cited in the file of this patent

UNITED STATES PATENTS

| | | |
|---|---|---|
| 1,439,823 | Kaufmann | Dec. 26, 1922 |
| 1,541,987 | Mascall | June 16, 1925 |
| 2,040,451 | Taylor | May 12, 1936 |
| 2,113,203 | Straubel | Apr. 5, 1938 |
| 2,301,601 | Wittwer | Nov. 10, 1942 |
| 2,301,851 | Boerger | Nov. 10, 1942 |
| 2,456,152 | Schneider | Dec. 14, 1948 |
| 2,650,179 | Anderson | Aug. 25, 1953 |
| 2,702,767 | Domingo | Feb. 22, 1955 |
| 2,725,892 | Gallistel | Dec. 6, 1955 |

FOREIGN PATENTS

| | | |
|---|---|---|
| 626,684 | Germany | Feb. 29, 1936 |